United States Patent [19]

Itoh et al.

[11] Patent Number: 4,703,652
[45] Date of Patent: Nov. 3, 1987

[54] PIZEOELECTRIC TYPE LIQUID LEVEL SENSOR AND FABRICATING METHOD THEREOF

[75] Inventors: Akio Itoh, Nagoya; Kazunori Sumi, Kagamihara; Sigeo Saitoh, Kuwana; Hideo Sobue, Kuwana; Hideo Sobue, Nagoya, all of Japan

[73] Assignee: NGK Spark Plug Co., Ltd., Aichi, Japan

[21] Appl. No.: 803,555

[22] Filed: Dec. 2, 1985

[30] Foreign Application Priority Data

Dec. 1, 1984 [JP] Japan .................. 59-254712
Jan. 26, 1985 [JP] Japan .................. 60-9799[U]

[51] Int. Cl.$^4$ ............... G01F 23/22; G01F 23/28
[52] U.S. Cl. .................. 73/290 V; 340/621; 29/25.35; 310/321; 310/324
[58] Field of Search ........ 73/290 V; 340/621; 367/157, 155, 152, 162, 176; 310/321, 337, 351, 338, 332, 324; 29/25.35

[56] References Cited

U.S. PATENT DOCUMENTS

| | | | |
|---|---|---|---|
| 2,741,754 | 4/1956 | Miller | 367/162 |
| 3,266,311 | 8/1966 | Andreasen et al. | 340/621 |
| 3,271,596 | 9/1966 | Brinkerhoff | 367/162 |
| 3,706,981 | 12/1972 | Hart | 340/621 |
| 3,777,192 | 12/1973 | Barrow | 367/176 |
| 3,995,179 | 11/1976 | Flournoy et al. | 367/162 |
| 4,507,583 | 3/1985 | Jensen | 73/290 V |
| 4,570,483 | 2/1986 | Sobue | 73/290 V |
| 4,594,891 | 6/1986 | Benz et al. | 73/290 V |

FOREIGN PATENT DOCUMENTS 0187227 10/1984 Japan .................. 73/290 V
0613213 6/1978 U.S.S.R. .................. 73/290 V Primary Examiner—Charles Frankfort
Assistant Examiner—Thomas B. Will
Attorney, Agent, or Firm—Larson & Taylor

[57] ABSTRACT

Piezoelectric type liquid level sensor for detecting whether the level of various liquids such as oil of an internal combustion engine, a generator or the like is a predetermined value or higher or not, and method of making the sensor. The sensor is arranged to eliminate the influence of the weight of the lead wires on the vibration element and to facilitate its assembly. The sensor may be provided with a damper member for increasing the sensitivity.

6 Claims, 10 Drawing Figures

PIEZOELECTRIC TYPE LIQUID LEVEL SENSOR AND FABRICATING METHOD THEREOF

FIELD OF THE INVENTION

This invention relates to a piezoelectric type liquid level sensor and a method of fabricating it and, more particularly, to a piezoelectric type liquid level sensor for detecting whether the level of various liquids such as oil of an internal combustion engine, a generator or the like is a predetermined value or higher or not.

BACKGROUND OF THE INVENTION

The piezoelectric type liquid level sensor is constituted for a bimorph type liquid sensing unit by liquid-tightly bonding a vibration plate to the lower end opening of a metal protection conduit so that one surface of the vibration plate is externally exposed and by bonding a piezoelectric element to the inner surface of the vibration plate. In such a level sensor, the fibration plate is disposed at a height corresponding to a predetermined liquid level, and when the liquid in a vessel is at a predetermined level or higher, the outer surface of the vibration plate is dipped in the liquid. Accordingly, even if an alternating voltage is applied to the upper and lower surface electrodes of the piezoelectric element, the element cannot vibrate because of the hydraulic pressure of the liquid. If the liquid level is at the predetermined level or lower, the outer surface of the vibration plate is exposed to the atmosphere, the application of the hydraulic pressure of the liquid is released, and the element can be vibrated. Thus, the fact that the level of the liquid is at the predetermined level or lower can be detected by detecting the vibration of the element.

Such an arrangement is heretofore known. One example of conventional arrangements is shown in FIG. 1 of the accompanying drawings, in which a vibration plate A is provided with a piezoelectric element B having an exciting moving electrode C and a feedback electrode D on one surface and a common electrode E on the other surface, and is oiltightly bonded to the lower end of a metal body conduit F having a suitable length, a cable G is mounted on a packing H provided into an upper end port of the conduit F, and lead wires I, J and K extending from cable G are respectively connected to the electrodes C, D and the conduit F.

In the aforementioned known piezoelectric type liquid level sensor, the lead wires I, J and K must be respectively passed through the interior of the conduit F, and bonded to the vibration plate A and the body conduit F, and the packing H must be engaged with the upper end port of the conduit F so as to assembly it. Further, in order to absorb the vibration and fluctuation applied to the conduit F, the lead wires must be slackened in the conduit F. However, since the lead wires extending from the vicinity of the packing are long and heavy in weight, almost all of the weight of the lead wires is applied to the piezoelectric element B. This disturbs the vibration of the vibration element including the vibration plate A and the piezoelectric element B when voltage is applied, and thus a noise is induced in a detection signal on the lead wire J.

The frequency of the alternating voltage applied to the piezoelectric element is set so that it coincides with the resonance frequency of the liquid sensing unit in which the vibration plate is bonded to the piezoelectric element so as to improve the vibration of the piezoelectric element upon application of the voltage to the element. The atmospheric temperature of the position for mounting the level sensor might increase such as where the sensor is used to detect the liquid level of oil in an oil tank of an automobile. In this case, the resonance frequency of the sensing unit is increased. Thus, if the liquid level lowers so that the surface of the vibration plate is exposed to the atmosphere, the piezoelectric element may not vibrate corresponding to the applied voltage, the output signal from the sensor may drop, or a noise may be produced, thereby deteriorating the performance of the sensor.

It is, therefore, an object of this invention to provide a method of fabricating a piezoelectric type liquid level sensor in which the influence of the weight of the lead wires on the vibration element is eliminated and in which assembly of the sensor is facilitated.

Another object of the invention is to provide a piezoelectric type liquid level sensor for detecting whether the level of various liquids is a predetermined value or higher or not, in which the influence of the weight of the lead wires on the vibration element is eliminated.

A further object of the invention is to provide a piezoelectric type liquid level sensor in which the frequency band width capable of producing a preferable output signal is increased.

SUMMARY OF THE INVENTION

According to one aspect of this invention, there is provided a method of fabricating a piezoelectric type liquid level sensor comprising attaching a piezoelectric element having an exciting electrode and a feedback electrode on one surface thereof and a common electrode on the other surface thereof to the central portion of a supporting member which has a large diameter by bring said common electrode into contact therewith, mounting said supporting member on the lower end of a ring-shaped base member having and inner diameter larger than said piezolectric element and a reduced diameter formed at the upper end, bonding a ring-shaped insulating member to the reduced-diameter end of said base member, providing a terminal forming member which has three terminals projected at angularly spaced from one another on the inner periphery of a holding ring having a diameter larger than said insulating member, removing the holding ring after bonding the terminals of said terminal forming member to said insulating member, connecting the first and second terminals individually to the exciting electrode and the feedback electrode of the piezoelectric element, individually connecting insulated lead wires to said first and second terminals, and bonding by welding the lower end of a metal body conduit through which the lead wires or a predetermined number of lead wires including said lead wires are passed to said base member.

It is preferred that the supporting member comprises a vibration cap formed in a tray shape.

The element including the piezoelectric element and the vibration member is not mounted directly on the metal body, but is mounted on the lower end of the ring-shaped base member having an inner diameter larger than the outer diameter of the piezoelectric element, the ring-shaped insulating member is secured to the upper end of the base member, and the three terminals are bonded onto the insulating member by using the terminal forming member formed with the three terminals at the angular difference on the inner periphery of the holding ring. Since the terminal forming member can be shaped by press means, the indexing of the bonding positions can be simplified as compared with the case that the plural terminals are individually bonded to the insulating member, thereby remarkably saving the works. Further, since the holding ring of the terminal forming member is separated after the terminals are bonded, the terminals can be electrically independently formed, and are not shortcircuited. The two of the three terminals are connected through fine wires to the exciting and feedback electrodes of the piezoelectric element, and the ring-shaped base member for supporting the insulating member on the upper end face may be low in the height. Accordingly, the lead wires may be short, and the weight of the wires are not applied to the piezoelectric element. Thus, the sensor can be fabricated in the structure that the vibration of the vibration element is not disturbed when a voltage is applied to the piezoelectric element. In addition to the lead wires connected the terminals, the lead wires which include a lead wire connected to one electrode such as a negative electrode of a voltage power source are, as required, inserted into the central hole of the metal body conduit, and projected from the upper end, the lower end of the body conduit is engaged with the outer periphery of the insulating member, calked, and mounted on the ring-shaped base member by welding or soldering. Therefore, the level sensor thus fabricated can prevent the liquid from invading into the interior by the vibration member, the ring-shaped base and the metal body conduit. Thus, the weight is not applied to the piezoelectric element, the three terminals can be readily mounted, and the level sensor in which a ground is, as required, mounted on the metal body conduit can be manufactured in the shape having an externally small difference from the conventional level sensor.

According to a second aspect of this invention, there is provided a piezoelectric type liquid level sensor comprising a piezoelectric element having an exciting electrode and a feedback electrode attached onto one surface thereof and a common electrode on the other surface thereof, a member for supporting said piezoelectric element on the central portion thereof said supporting member being oiltightly mounted at the lower end of a ring-shaped base member having an inner diameter larger than the piezoelectric element and a reduced diameter formed at the upper end, a ring-shaped insulating member bonded to the reduced-diameter end of said base member, three terminals provided at angularly spaced from one another on said insulating member, the two of the three terminals being individually connected to the exciting electrode and the feedback electrode of said piezoelectric element, and a metal body conduit through which insulated lead wires individually connected to the said two terminals, are passed the lower end of said metal body conduit being bonded by welding to said base member and the third terminal being used as a ground terminal connected with the base member and connected with the inner surface of said metal body conduit.

The level sensor can be constructed so that the weight of the ring wires is not applied to the piezoelectric element of the vibration element and the metal body can be further grounded, and the wires can be consequently diminished.

According to a third aspect of this invention there is provided a piezoelectric type liquid level sensor for detecting the presence or absence of liquid comprising a vibration plate liquidtightly bonded to the lower end opening of a metal protection conduit so that one surface of the vibration plate is externally exposed, a piezoelectric element bonded to the inner surface of said vibration plate to form a bimorph type liquid sensing unit to vibrating said piezoelectric element when the exposed outer surface of said vibration plate is not contacted with the liquid, and a damper member coated at least on one surface of said vibration plate.

Said damper member may be a foamable material containing discontinuous air bubbles such as sponge, cork, rubber or foamable plastic.

BRIEF DESCRIPTION OF THE DRAWINGS

The above and other objects, features, and advantages of the present invention will become apparent upon consideration of the following detailed description of specific embodiments thereof, especially when taken in conjunction with the accompanying drawings.

DETAILED DESCRIPTION

Reference is now made to FIGS. 2, 3, 4 and 5, of the drawings which schematically shows the construction of an apparatus according to an embodiment of the present invention.

Figure 1:
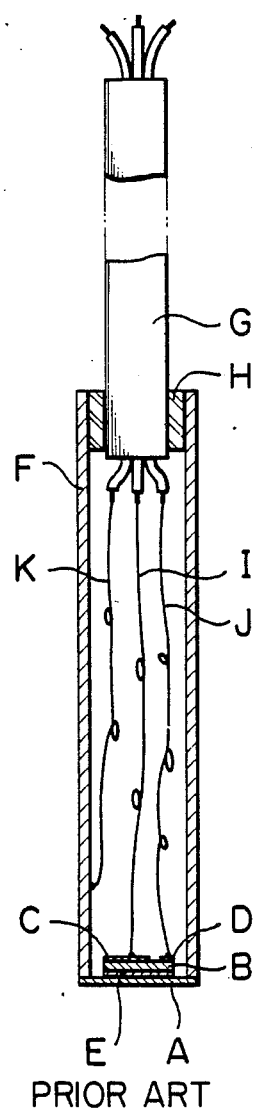
FIG. 1 is a longitudinal front sectional view of the conventional piezoelectric type liquid level sensor.
Figure 2:
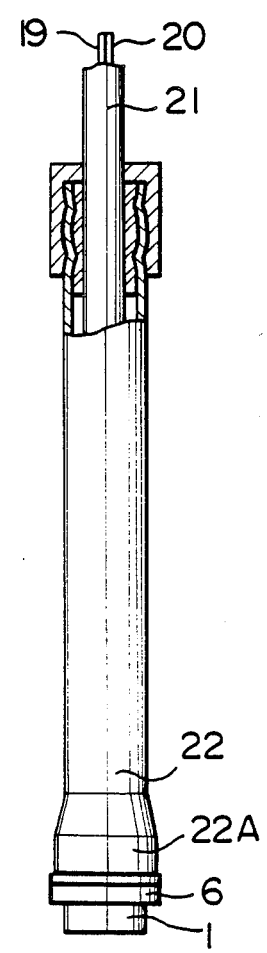
FIG. 2 is a partial fragmentary front view showing a sensor according to one embodiment of this invention.
Figure 3:
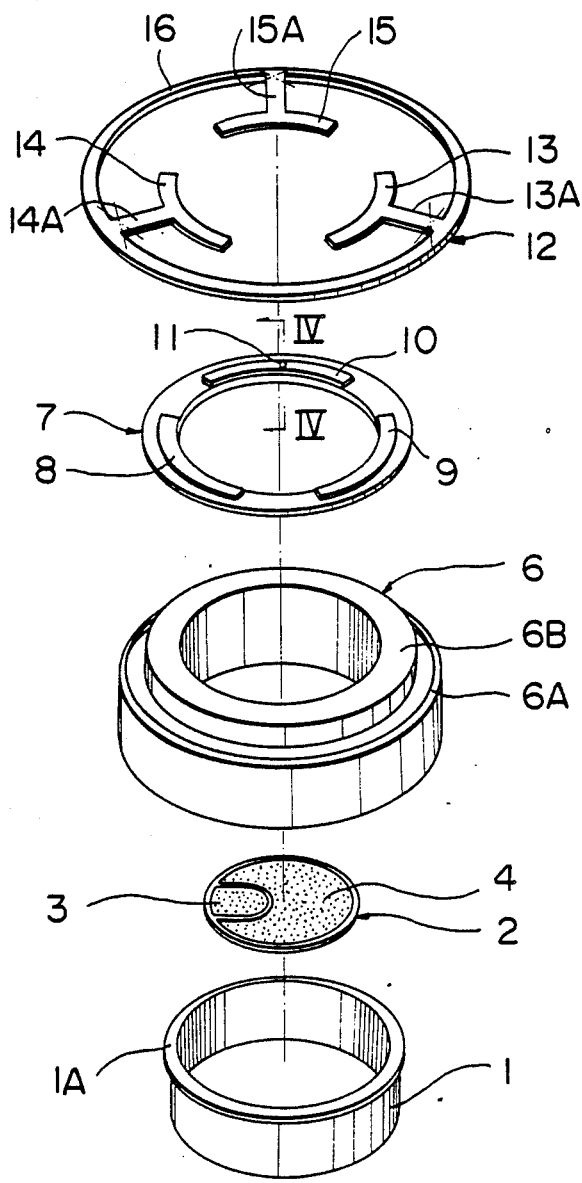
FIG. 3 is an exploded perspective view showing parts of the sensor of FIG. 2.
Figure 4:
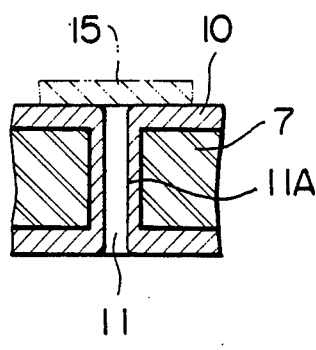
FIG. 4 is an enlarged side view in section taken along the line IV—IV in FIG. 3.

In Figures, reference numeral 1 designates a cap formed in a tray shape, in which a piezoelectric element 2 having an exciting electrode 4 and a feedback electrode 3 on one surface and a common electrode 5 on the other surface is bonded to the central portion of the inner surface of the cap 1. The cap 1 to be used has a size larger than the diameter of the element 2. Numeral 6 designates a ring-shaped base member which has an inner diameter larger than the outer diameter of the element 2 and is reduced upwardly in outer diameter to form a stepped surface 6A and a reduced-diameter end face 6B. The peripheral edge 1A of the cap 1 is oiltightly bonded to a shallow annular groove 6C formed on the lower end face of the base member 6. On the end face 6B of the base member 6 is bonded an insulating annular member 7 which may be made of alumina ceramics and has a smaller thickness. The insulating annular member 7 has metallized portions 8, 9 and 10 formed at an equal angle on the upper surface thereof. At the center of the metallized portion 10 is provided in a fine hole 11 which has a metallized peripheral wall 11A as shown in FIG. 4. The base member 6 and the metallized portion 10 of the insulating annular member 7 are electrically connected to each other by the metallized peripheral wall 11A of the fine hole 11.

Reference numeral 12 designates a terminal forming plate in which three terminal elements 13, 14 and 15 are projected at an equal angle interval and formed integrally on the inner periphery of the holding ring 16 having a diameter larger than the insulating annular member 7. Each of the terminal elements 13, 14 and 15 is formed in T-shape, the inner ends of the respective terminal elements 13, 14 and 15 are positioned by the holding ring 16 on the metallized portions 8, 9 and 10 of the insulating annular member 7, and bonded thereto with solder. The ring 16 is cut and removed from the portion marked by "x" in FIG. 3 after the bonding, and moustache-shaped terminal pieces 13A, 14A and 15A are projected from the respective terminal elements 13, 14 and 15.

The terminal elements 13 and 14 are individually connected to the electrodes 3 and 4 of the piezoelectric element 2 via fine metal wires 17 and 18, and the projecting pieces 13A and 14A of the terminal elements 13 and 14 are respectively connected to lead wires 19 and 20 of a cable 21 which is coated with an insulating material.

Figure 5:
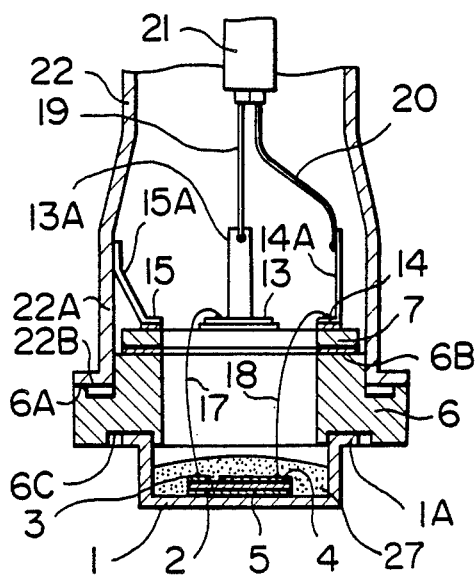
FIG. 5 is an enlarged sectional view showing the essential portion of the sensor.

Reference numeral 22 designates a metal body conduit formed at the lower end thereof with an increased-diameter portion 22A abutted on the stepped surface 6A of the base member 6. The cable 21 through which the lead wires 19 and 20 are passed are extended through the conduit 22 and are projected upwardly therefrom. As shown in FIG. 5, the projected portion 15A of the terminal element 15 is bent, the conduit 22 is passed to the outer periphery of the insulating annular member 7, and the lower end face 22B of the conduit 22 is oil-tightly bonded to the stepped surface 6A of the base member 6 by welding or brazing. The projected portion 15A of the terminal element 15 is contacted with the inner surface of the conduit 22. In other words, the conduit 22 provides a ground connection for the common electrode 5 of the piezoelectric element 2.

After the metal conduit 22 is bonded as described above, the cable 21 is tensioned, and fixed by caulking.

The lead wire 20 used for applying the voltage to the element 2, and the lead 19 is used for taking out a signal current which may be produced by the vibration of the vibration element comprising the piezoelectric element 2 and the cap 1.

Figure 6:
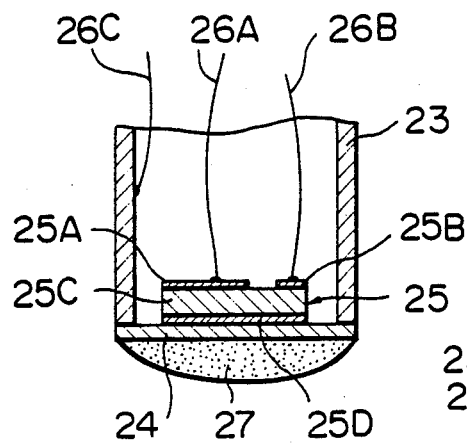
FIG. 6 is a longitudinal sectional view showing another embodiment according to this device.

Referring to FIG. 6, there is shown another embodiment of this invention. Reference numeral 23 designates a slender protection conduit formed of a corrosion resistant metal material such as stainless steel, and a vibration plate 24 made of a thin metal plate is fixed to the lower end opening of the conduit 23 by watertightly bonding the peripheral edge of plate 24 to the conduit. A piezoelectric element 25 which construct a bimorph type oil sensing unit is fixed together with the plate 24 to the central portion of the inner surface of the plate 24. The piezoelectric element 25 is constructed in a 3-terminal type structure by providing an exciting electrode 25A having a large area and a feedback electrode 2B having a small area on the upper surface of a piezoelectric ceramic disc 25C made of lead titan-zirconate and further providing a common electrode 25D opposed to the electrodes 25A, 25B on the lower surface of the disc 25C in contact with the plate 24. Fine metal wires 26A and 26B are respectively connected to the electrodes 25A and 25B, and a fine metal wire 26C is bonded to the inner surface of the protective conduit 23, thereby electrically connecting them through the conduit 23 to the common electrode 25D.

In addition, synthetic resin agent (not shown) is filled in the protection conduit 23, the fine metal wires 26A, 26B and 26C are held in an insulated state with the synthetic resin agent, and the load on the piezoelectric element 25 may be prevented.

As shown in FIG. 6, a damper material 27 made of a foamable material having discontinuous air bubbles such as sponge, cork, rubber or foamable plastic is coated on the lower surface of the vibration plate 24. In addition, the damper material 27 may be capable of decreasing the Qm value of the liquid sensing unit.

Figure 7:
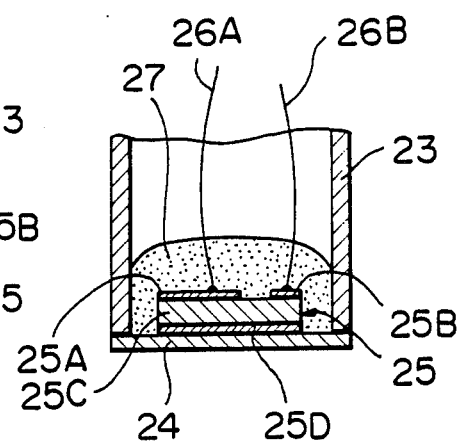
FIG. 7 is a longitudinal sectional view showing the essential portion of modified embodiment of the device.

The damper material 27 may also be, as shown in FIG. 7, coated on the vibration plate 24 and the piezoelectric element 25 in the protective conduit 23.

Figure 8:
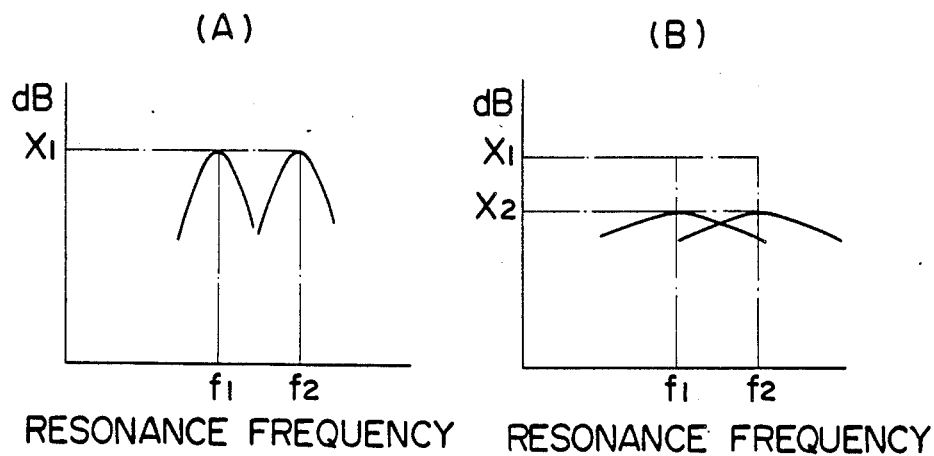
FIGS. 8(A) and 8(B) are graphs showing the relationships among the resonance frequency f, the gain dB and the temperature.

Further, the damper material 27 may be coated on both the upper and lower surfaces of the vibration plate 24. FIGS. 8(A) and 8(B) show relationship between the resonance frequency f and the gain dB of the sensor. In the conventional sensor, the Qm value of the liquid sensing unit is high as shown in FIG. 8(A), and the top of the resonance frequency curve is sharp. Thus, when the temperature rises, the resonance frequency shifts from $f_1$ to $f_2$ and the output voltage of the sensing unit substantially decreases.

When the damper material is, however, coated on the surface of the vibration plate the Qm value of the sensing unit reduces, and the sharpness of the top of the resonance frequency curve diminishes as shown in FIG. 8(B). Thus, the frequency band width capable of producing a preferable output voltage from the sensing unit increases. Then, even if the external atmospheric temperature rises and the resonance frequency characteristic shifts to $f_2$, the output voltage of the sensing unit does not remarkably lessen.

The gain of the resonance frequency decreases from $x_1$ to $x_2$ by coating the damper material on the surface of the vibration plate. But the output signal can be produced without fail even if the resonance frequency changes from $f_1$ to $f_2$ because of the small change in output voltage which accompanies the change in resonance frequency.

Figure 9:
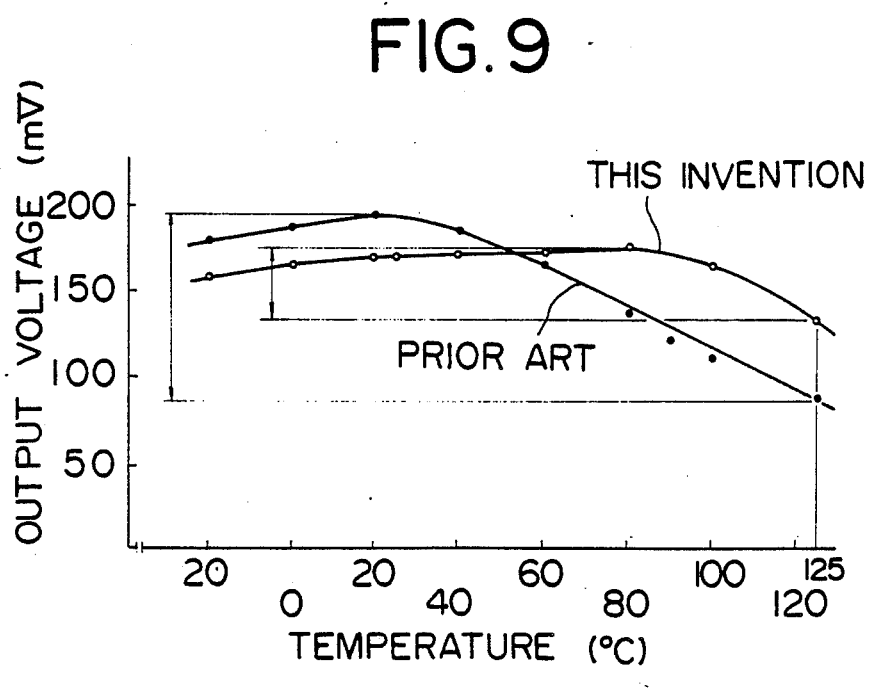
FIG. 9 is a graph showing the relationship between the output voltage and the temperature.

The temperature characteristic of the sensor thus constructed will be compared with the conventional one in FIG. 9.

The damper material 27 is made of rubber.

As shown in FIG. 9, the output of the conventional level sensor is, for example, 88 mV at 125° C. in the high temperature range, which represents a decrease of 55% with respect of the maximum output value of 195 mV. When the rubber is used as the damper material 27 as in the embodiment shown in FIGS. 6 and 7, the output is 131 mV at 125° C., which represents a decrease of only 26% with respect to the maximum output value of 175 mV. Thus, when the liquid level is detected in an environment in which the variation in temperature is substantial, the present device is very effective.

According to this invention as described above, the level sensor can be assembled such that the weights of the lead wires are not applied to the piezoelectric element, and such that the level sensor is not influenced by the fluctuation of the lead wires themselves.

This invention has also effects of reducing the number of lead wires used and of constituting the piezoelectric type liquid level sensor.

Further, by providing the damper material on the surface of the vibration plate, it is possible to diminish the Qm value and to increase the resonance frequency band width. Therefore, even if the environmental temperature varies so that the resonance frequency characteristic of the liquid sending unit alters, the level sensor provides excellent advantages that the output does not greatly decrease and the liquid level can be preferably detected.

While this invention has been described in detail with respect to certain now preferred embodiments, it will be understood by those skilled in the art that various changes and modifications may be made without departing from the spirit and scope of the invention, and it is intended, therefore, to cover all such changes and modifications in the appended claims. For example, in the embodiment shown in FIGS. 2, 3, 4 and 5 the surface of the cap may be coated with a damper material as in the embodiments of FIGS. 6 and 7. For example, as shown in FIG. 5, damper material 27 may be provided on the upper surface of cap 1.

What is claimed is:

1. A method of fabricating a piezoelectric type liquid level sensor comprising:

attaching a piezoelectric element having an exciting electrode and a feedback electrode on one surface thereof and a common electrode on the other surface thereof to a central portion of a supporting member by bringing said common electrode into contact therewith;

mounting said supporting member on a lower end of a ring-shaped base member, said base member having an inner diameter larger than that of said piezoelectric element and a reduced outer diameter formed at its upper end;

bonding a ring-shapped insulating member to the reduced-diameter end of said base member;

providing a terminal-forming member, said terminal-forming member comprising a holding ring having an inner periphery which has a diameter larger than that of said insulating member, said terminal-forming member having three terminals projected at locations angularly spaced from one another on said inner periphery of said holding ring;

removing the holding ring after bonding the terminals of said terminal forming member to said insulating member;

connecting a first and second of said three terminals individually to the exciting electrode and the feedback electrode respectively of the piezoelectric element;

individually connecting insulated lead wires to said first and second terminals;

connecting the third of said three terminals to said base member and to a lower end of a metal body conduit through which said lead wires are passed; and oiltightly bonding said base member to said lower end of said metal body conduit.

2. A method as claimed in claim 1, wherein said supporting member comprises a vibration cap formed in a tray shape.

3. A method as claimed in claim 1, wherein said terminal forming member is formed by press means.

4. A piezoelectric type liquid level sensor comprising:

a piezoelectric element having an exciting electrode and a feedback electrode attached onto one surface thereof and a common electrode on the other surface;

a member for supporting said piezoelectric element on a central portion thereof, said supporting member being oiltightly mounted at a lower end of a ring-shaped base member having an inner diameter larger than the piezoelectric element and a reduced outer diameter formed at its upper end;

a ring-shaped insulating member bonded to the reduced-diameter end of said base member;

three terminals provided at locations angularly spaced from one another on said insulating member;

two of the three terminals being individually connected to the exciting electrode and the feedback electrode, respectively of said piezoelectric element; and a metal body conduit through which insulated lead wires individually connected to the two terminals are passed, a lower end of said metal body conduit being oiltightly bonded by welding to said base member; and the third of said three terminals being connected to the base member and to an inner surface of said metal body conduit.

5. A piezoelectric type liquid level sensor as claimed in claim 4, wherein said supporting member comprises a vibration cap formed in tray shape.

6. A piezoelectric type liquid level sensor as claimed in claim 4, wherein said supporting member has at least one surface provided with a damper member.

* * * * *